United States Patent [19]

Easton

[11] Patent Number: 4,832,116
[45] Date of Patent: May 23, 1989

[54] HEAT EXCHANGER WITH PRESSURIZED PLENUM

[75] Inventor: David J. Easton, Cedar Falls, Iowa
[73] Assignee: Deere & Company, Moline, Ill.
[21] Appl. No.: 127,728
[22] Filed: Dec. 2, 1987
[51] Int. Cl.$^4$ .............................................. F28F 19/00
[52] U.S. Cl. .................... 165/126; 165/77; 165/95; 165/119; 165/124
[58] Field of Search .................... 165/86, 95, 124, 126, 165/77, 119

[56] References Cited

U.S. PATENT DOCUMENTS

| | | | |
|---|---|---|---|
| 1,278,414 | 9/1918 | Arneil | 165/126 |
| 2,383,292 | 8/1945 | Dalzell et al. | 165/77 X |
| 3,313,342 | 4/1967 | Laing | 165/124 |
| 4,295,521 | 10/1981 | Sommars | 165/69 |

Primary Examiner—Albert J. Makay
Assistant Examiner—Allen J. Flanigan

[57] ABSTRACT

Two flat radiators are arranged in a V, with a gap at the base of the V. The ends of the radiators preferably are closed off to form a plenum chamber between the radiators. A fan, preferably of the transverse flow type, is provided at the top of the radiators to pressurize the plenum chamber, which causes air to pass out through the radiator cores. The fan also directs air from the top of the V towards the gap so that debris is directed out the gap. The radiators may have a significantly higher fin density than in the conventional radiator since debris need not pass through the radiator cores. In an alternative embodiment, four radiators are arranged in a nested double V, with a gap at the base of the outermost V. Two fans, again preferably of the transverse flow type, are provided to direct air into the top of the V. Operation is similar to the single V structure, except that in low cooling requirement conditions, one of the fans may be turned off.

22 Claims, 3 Drawing Sheets

HEAT EXCHANGER WITH PRESSURIZED PLENUM

BACKGROUND OF THE INVENTION

1. Field of the Invention

The present invention relates to cooling systems, and particularly radiators for vehicle cooling systems.

2. Description of the Related Art

Vehicle engine coolant radiators conventionally are positioned across the front of a vehicle, parallel to the vehicle front, which forces air through the radiator due to motion of the vehicle in the forward direction. In addition, a radiator fan normally is provided behind the radiator to draw even greater quantities of air through the radiator.

Many variations on this positioning are known. For example, U.S. Pat. No. 3,715,001 (Wilson) teaches a flat radiator which is angled relative to the vertical axis. The top and bottom sides of the radiator are sealed against the walls of a chamber, and fans are provided on each side of the radiator. This structure allows air to flow in from the top and out the side of the radiator, or vice versa, and avoids the need for air to pass beyond the chamber behind the radiator. However, all air flowing through the system must flow through the radiator.

U.S. Pat. No. 3,995,603 (Thien et al.) teaches positioning two flat radiators at an angle relative to one another about the central axis at the front of an engine. The closer edges of the two radiators are sealed by a housing, while the outer edges are sealed to a shroud surrounding an axial flow fan in front of the radiator. Again, all air must pass through the radiator.

U.S. Pat. No. 4,076,072 (Bentz) teaches a radiator structure having a plurality of angled core elements arranged in a zigzag pattern with the apices of the zigzag extending to the front and back of the vehicle. An axial flow fan is provided behind this zigzag radiator structure.

In some applications, e.g., agricultural and industrial equipment, large volumes of debris are found in the air as it approaches the radiator. With the aforementioned structures, all of this air, together with any debris it is carrying, must pass through the radiator. As a result, the practical limitation on the density of radiator fins is about 3 to 4 fins per centimeter (8 to 10 fins per inch). Any more than this, and the radiator quickly becomes clogged with debris.

U.S. Pat. Nos. 4,401,154 (Anders et al.) and 4,542,786 (Anders) elaborate on the particulars of the core elements of the Bentz structure. In the Anders references, a slight gap is provided at the rear apex of adjacent core elements, so that air can flow between the core elements rather than through the core elements. Adjacent core elements are not sharply angled relative to one another, so that the general air flow impinges on the face of each core element, causing some degree of turbulence. Indeed, the second Anders patent is an attempt to reposition coolant tubes through the core elements in an attempt to reduce this turbulence.

The slight spacing provided in the Anders references allows some debris to pass the radiator without going through the core elements. This in turn means that the radiator fins can be packed more closely together. Although this is not mentioned in the patents, the commercial embodiments have fin densities on the order of 13-14 fins per centimeter (33-35 fins per inch). The Anders structures have the disadvantage that the number of core elements and their positioning creates a high degree of complexity and turbulence. In addition, providing gaps between each of half a dozen core elements means that a substantial volume of air is passing through the gaps, where it has no cooling effect. Finally, once through the radiator, the debris-laden air is blown back on the engine where the debris may be deposited.

SUMMARY OF THE INVENTION

Accordingly, it is the purpose of the present invention to provide a novel cooling system wherein debris can pass easily past, rather than through, a radiator element. Preferably, the debris then is directed away from the vehicle engine. A significantly increased fin density on the radiator elements also preferably is provided.

Theses purposes are fulfilled according to a first embodiment of the invention by providing two substantially flat radiators positioned adjacent one another in a V shape. A slight gap is provided at the base of the V and the edges of the V preferably are sealed so that the space between the radiators forms a plenum chamber. A fan, preferably of the transverse flow variety, forces air into the plenum in a direction substantially towards the opening at the base of the V. This simultaneously directs any debris in the air towards the gap and pressurizes the plenum chamber, so that air will flow outwardly through the radiator elements due to the pressure differential across them. Since only one gap is needed, only a small amount of air passes through the system without contacting the cooling fins.

The fins of the radiator elements preferably are directed substantially parallel to the V to minimize resistance to air flow towards the base. Since no debris no longer need flow through the radiator elements, the fin density can be increased substantially, e.g., to 12 fins per centimeter (30 fins per inch), or more. In addition, at least one of the radiator elements preferably is mounted pivotally to allow access to the plenum chamber for cleaning and the like.

According to a second embodiment of the invention, four radiator elements are provided, arranged in two nested Vs. The base of the outermost V again has a gap to allow passage of debris, while the base of the inner V preferably is sealed. Air preferably is directed by two fans of the transverse flow variety between the two Vs towards the base opening in the outermost V. The fans preferably are independently controllable so that one can be shut off in low cooling demand conditions.

DETAILED DESCRIPTION OF THE PREFERRED EMBODIMENTS

Figure 1:
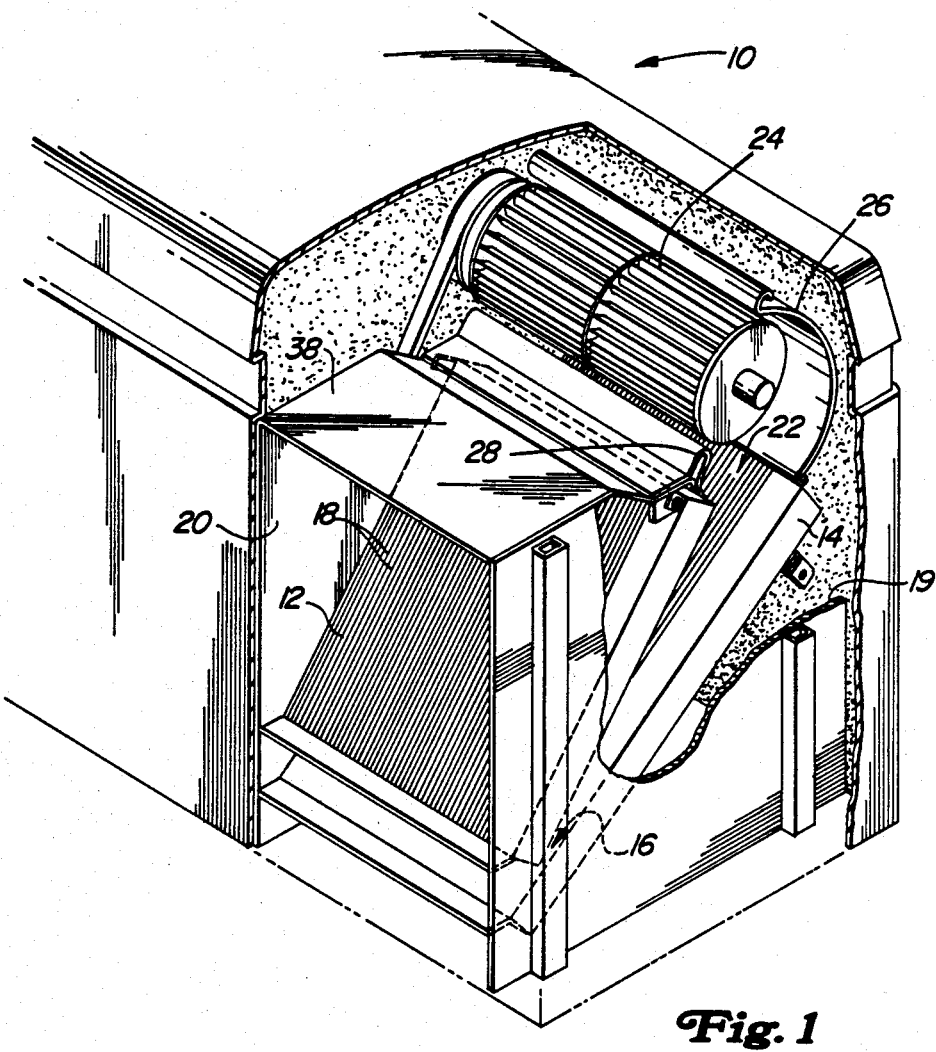
FIG. 1 is a perspective view of a first embodiment of a cooling arrangement according to the present invention.

FIG. 1 illustrates a first preferred embodiment of the cooling system according to the present invention shown in a cut-away vehicle body, here a tractor body 10. Two substantially flat rectangular radiators 12, 14 are positioned in the tractor body 10 in a V arrangement. A slight gap 16 is provided at the bas of the V between the two radiators 12, 14. A gap on the order of 5-20 millimeters (0.2-0.8 inches) generally would be sufficient, though larger or smaller gaps can be used if desired.

The fins 18 of the radiators 12, 14 preferably are arranged to extend along the V. The sides of the V preferably are closed by end walls 19, 20, thereby creating a plenum chamber 22 between the radiators 12, 14 and end walls 19, 20.

Figure 2:
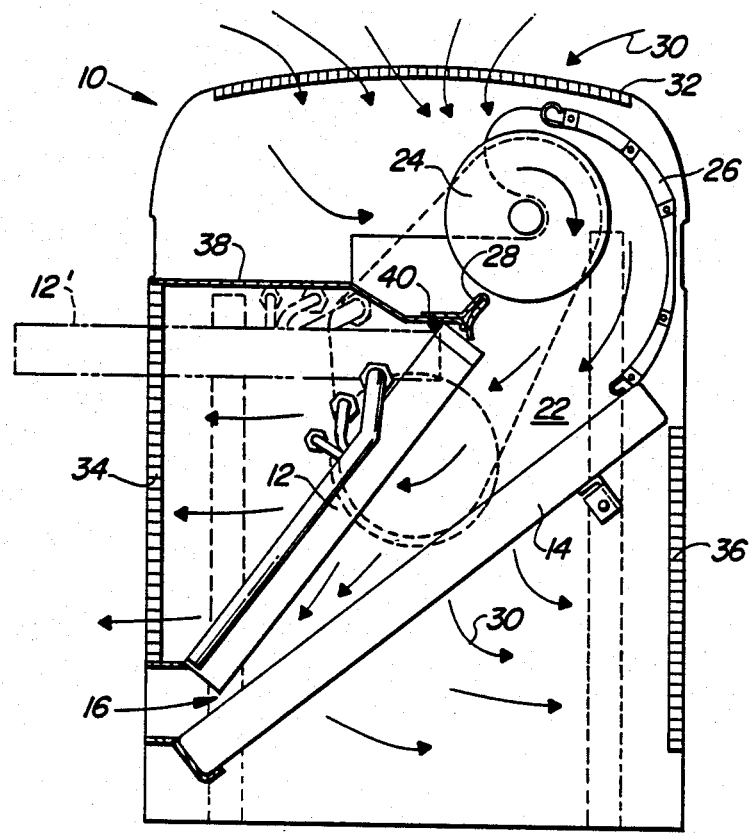
FIG. 2 is a front end view of the embodiment of FIG. 1.

A transvers flow fan 24 is shown positioned at the top of the radiator V. A cowl 26 and cut-off 28 direct air from the fan into the V. As best seen in FIG. 2, air flow (represented by the arrows 30) through a transverse flow fan is generally radially in through one side of the fan impeller and generally radially out through the other side of the fan impeller. The direction of flow is determined by the shape and positioning of the cowl 26 and cut-off 28. Any fan may be used, including non-transverse flow fans, but a transverse flow fan is preferable because it creates a substantially uniform distribution of air across the width of the radiators 12, 14.

Continuing with FIG. 2, in operation, air flows in through a grating 32 at the top of the tractor body 10, is drawn through the fan 24 and blown into the plenum chamber 22. This pressurizes the plenum chamber 22, forcing air out through the radiators 12, 14. This air then is expelled through grates 34, 36 on the sides of the vehicle body 10. Plate 38 preferably is provided between the radiator 12 and the upper portion of the vehicle body 10 to ensure separation of the inward and outward air flow.

Any debris sucked in through the top grate 32 will be propelled by the fan 24 and directed by the cowl 26 in a direction generally downwards in the V towards the gap 16 at the base of the V. This will carry most of the debris out through the gap 16. Positioning the fins so that they run substantially parallel to the V minimizes air turbulence or any other interference with the flow of debris towards the gap 16.

The radiators 12, 14 shown in FIGS. 1 and 2 are positioned angled relative to the horizontal plane of the tractor body 10 so that the base of the V is to one side of the tractor. The radiators may be positioned so that the base of the V is in any direction relative to the vehicle body, though the base preferably is generally on the lower side of the V, so that gravity can assist rather than hinder the operation of the cooling arrangement.

Figure 4:
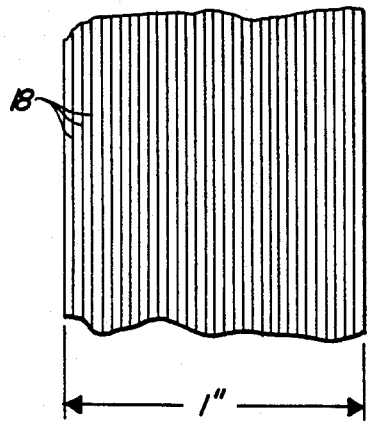
FIG. 4 illustrates the fin density provided in the cooling arrangement according to the present invention.
Figure 5:
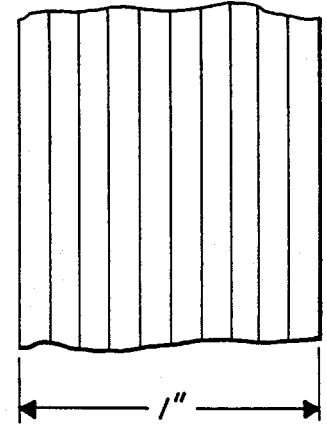
FIG. 5 illustrates the fin density provided in a conventional cooling core.

Since debris need not pass through the radiators 12, 14, the fins 18 in the cooling arrangement according to the present invention may be packed considerably more densely than in a conventional radiator. Conventional radiators have approximately 2 to 4 fins per centimeter (5 to 10 fins per inch), while the radiators used in the current structure can easily have 8 to 14 fins per centimeter (20 to 36 fins per inch), or even more. FIG. 4 schematically illustrates the preferred fin density according to the present invention of 32 fins per inch and FIG. 5 the typical 10 fins per inch according to the prior art, to illustrate this considerable increase in density. Naturally, increased fin density allows significantly enhanced cooling for a given radiator size.

Returning to FIG. 2, the side grate 34 preferably is removable and the radiator 12 is mounted pivotally by a hinge 40 so that it can be swung up to the phantom position 12'. This allows access to the plenum chamber 22 to allow cleaning of any debris which may accumulate.

Figure 3:
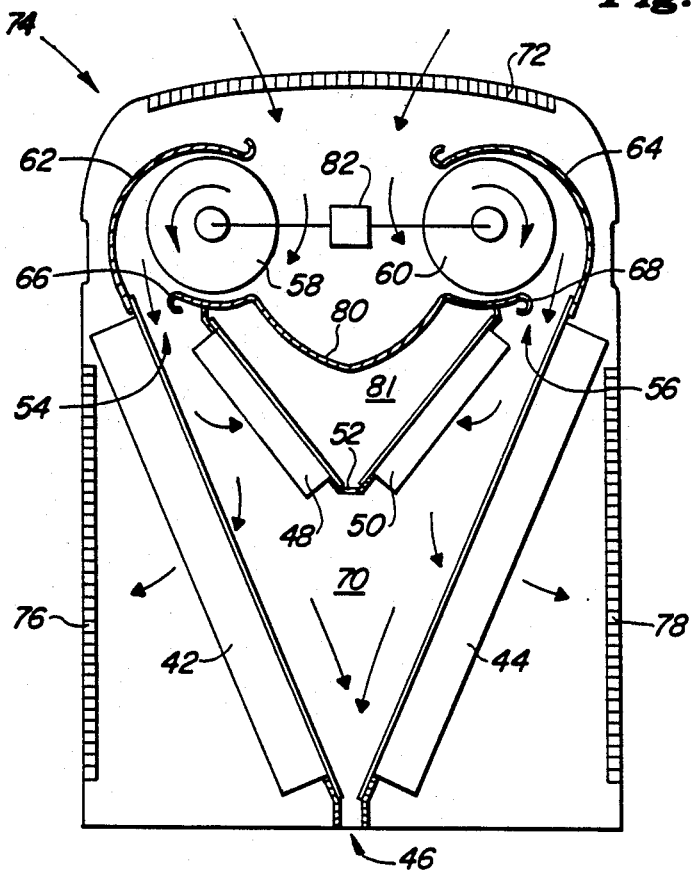
FIG. 3 is a front end view of a second embodiment according to the present invention.

FIG. 3 illustrates a second preferred embodiment of the cooling arrangement according to the present invention. This embodiment uses a double, rather than a single, V structure. Again, two radiators 42, 44 are arranged in a V with a gap 46 at the base of the V. This time, however, two additional radiators 48, 50 are arranged in a V inside the V formed by the larger radiators 42, 44. Preferably, a plate 52 or other means is used to close any gap at the base of the V formed by radiators 48, 50. Gaps 54, 56 are provided between the top ends of the radiators 42, 48 and 44, 50, respectively.

Two transverse flow fans 58, 60 are mounted above the radiators 42, 44, 48, 50. Cowls 62, 64 and cut-offs 66, 68 direct the air flow from the fans 58, 60, respectively, into the gaps 54, 56, respectively, and towards the gap 46 at the base of the outer V. End walls again are provided to close off the ends of radiators 42, 44, 48, 50 to create a plenum chamber 70 therebetween.

In operation, air flows in through a top grate 72 in a vehicle body 74, through the transverse flow fans 58, 60, and into the plenum chamber 70. Again, this pressurizes the plenum chamber 70 and forces air out through the radiators 42, 44, 48, and 50. Air passing out through the radiators 42, 44 passes through grates 76, 78 on the sides of the vehicle body 74. Air passing through the radiators 48, 50 is kept from recirculating by a plate 80, instead passing out through the ends of the chamber 81 defined between the radiators 48, 50 and the plate 80. Again, any debris passing through the fans 58, 60 is directed by the cowls 62, 64, respectively, towards the gap 46 at the base of the outer V, so that it does not have to pass through the radiator cores. The radiator cores again preferably have a high fin density and have their fins aligned with the sides of the Vs.

This second preferred embodiment has the advantage that it is possible to provide more, or more varied, radiator surfaces. In addition, control menas, schematically shown at 82, can be provided to shut off one of the fans 58, 60 in situations where only a low level of cooling is required. The remaining fan then can provide the necessary cooling.

While the present invention has been described with respect to certain preferred embodiments, it is to be understood that one of ordinary skill in the art could easily make various modifications thereto. The invention therefore is intended to be limited only by the scope of the following claims.

I claim:

1. A heat exchange apparatus comprising:
   at least two substantially flat heat exchangers arranged adjacent each other in a V configuration, with a slight gap provided between said exchangers at the base of the V, said heat exchangers together acting as a diffuser for a cooling medium which can pass through said exchangers,
   a plenum chamber defined between said exchangers;
   pressurization means for increasing the pressure of the cooling medium in said plenum chamber and for imparting an initial flow to said cooling medium directed from the top of the V towards said gap;
   cowl means associated with and disposed relative to said exchangers and said pressurization means such that diffusion takes place over substantially the entire length of each heat exchanger.

2. The apparatus of claim 1, wherein said pressurization means comprises at least one fan and wherein said cowl means directs said cooling medium into said plenum chamber.

3. The apparatus of claim 1, wherein at least one of said heat exchangers is pivotally mounted so as to be pivotal away from the other exchanger to allow access to said plenum chamber.

4. The apparatus of claim 1, wherein said heat exchangers each have at least 8 heat exchange fins per centimeter between which said cooling medium can pass.

5. The apparatus of claim 1, further comprising side closing means for substantially closing the sides of said V, said plenum chamber being defined between said exchangers and said side closing means.

6. A heat exchange apparatus comprising:
first and second substantially flat heat exchangers arranged adjacent each other in a V configuration, with a slight gap provided between said exchangers at the base of the
third and fourth substantially flat heat exchangers arranged adjacent each other in a V configuration and disposed substantially within the V of said first and second heat exchangers;
a plenum chamber defined between said first and second exchangers and said third and fourth exchangers; and
pressurization means for increasing the pressure of a cooling medium in said plenum chamber and for imparting an initial flow to said cooling medium directed from the tops of the Vs towards said gap.

7. The apparatus of claim 6, wherein said pressurization means comprises at least two fans, each fan being disposed to blow said cooling medium between one of said first and second exchangers and one of said third and fourth exchangers.

8. The apparatus of claim 7, wherein each said fan comprises a transverse flow fan and a housing is provided to direct said cooling medium into said plenum chamber.

9. The apparatus of claim 7, further comprising means for controlling said fans to turn off one of said fans in low cooling demand conditions.

10. A heat exchange apparatus comprising:
a first substantially flat heat exchanger through which a cooling medium can pass;
a second substantially flat heat exchanger through which said cooling medium can pass, said second exchanger being adjacent to said first exchanger, with a first end thereof slightly spaced from a first end of said first exchanger and a second end thereof spaced from a second end of said first exchanger by a greater amount than the space between said ends, said first and second heat exchangers together acting as a diffuser for said cooling medium;
side means for substantially closing the sides of the space between said exchangers, thereby to define a plenum chamber between said means and said exchangers;
pressurizing means for increasing the pressure of said cooling medium in said plenum chamber; and
directional means for imparting an initial flow direction to said cooling medium directed between said exchangers and towards said first ends from said second ends, such that diffusion takes place over substantially the entire length of each said heat exchanger.

11. The apparatus of claim 10, wherein said pressurization means and said directional means comprise at least one fan and a housing to direct said cooling medium into said plenum chamber.

12. The apparatus of claim 11, wherein said at least one fan comprises a transverse flow fan.

13. The apparatus of claim 11, wherein said at least one of said first and second exchangers is pivotally mounted so as to be pivotal away from the other exchanger to allow acces to said plenum chamber.

14. The apparatus of claim 10, wherein said heat exchangers each have a plurality of heat exchange fins between which said cooling medium can pass.

15. The apparatus of claim 14, wherein said fins are substantially parallel and extend from said first end towards said second end.

16. The apparatus of claim 15, wherein each heat exchanger has at least about 8 said fins per centimeter.

17. A heat exchange apparatus comprising:
a first substantially flat heat exchanger through which a cooling medium can pass;
a second substantially flat heat exchanger through which said cooling medium can pass, said second exchanger being adjacent to said first exchanger, with a first end thereof slightly spaced from a first end of said first exchanger and a second end thereof spaced from a second end of said first exchanger by a greater amount than the spacing between said first ends;
a third substantially flat heat exchanger through which said cooling medium can pass, disposed substantially between, but spaced from, said first and second exchangers;
a fourth substantially flat heat exchanger through which said cooling medium can pass, disposed substantially between said second and third heat exchangers and spaced from said second exchanger;
side means for substantially closing the sides of the space between said exchangers, thereby to define a plenum chamber between said first, second, third and fourth exchangers and said side means;
pressurizing means for increasing the pressure of said cooling medium in said plenum chamber; and
directional means for imparting an initial flow direction to said cooling medium directed between said exchangers and towards said first ends from said second ends.

18. The heat exchanger of claim 17, wherein said pressurization means and said directional means comprise at least two fans and means for directing the flow of said cooling medium produced by said fans between said first and third exchangers and between said second and fourth exchangers, respectively.

19. The apparatus of claim 18, wherein each said fan comprises a transverse flow fan and said flow directing means comprises a housing to direct said cooling medium into said plenum chamber.

20. The apparatus of claim 19, further comprising means for controlling said fans to turn off one of said fans in low cooling demand conditions.

21. A heat exchange apparatus comprising:
two, and only two, substantially flat heat exchangers arranged adjacent each other in a V configuration, with a slight gap provided between said exchangers at the base of the V;
a plenum chamber defined between said exchangers; and pressurization means for increasing the pressure of the cooling medium in said plenum chamber and for imparting an initial flow to said cooling medium directed from the top of the V towards said gap, said pressurization means interacting with the cooling medium only for said two heat exchangers, and no others.

22. A heat exchange apparatus comprising:

two, and only two, substantially flat heat exchangers through which a cooling medium can pass, a first one of said heat exchangers being adjacent to a second one of said heat exchangers, with a first end thereof slightly spaced from a first end of said second exchanger and a second end thereof spaced from a second end of said second exchanger by a greater amount than said first end;

side means for substantially closing the sides of the space between said exchangers, thereby to define a plenum chamber between said side means and said exchangers;

pressurizing means for increasing the pressure of said cooling medium in said plenum chamber; and directional means for imparting an initial flow direction to said cooling medium directed between said exchangers and towards said first ends from said second ends, said pressurizing means and said directional means interacting with the cooling medium only for said two heat exchangers, and no others.

* * * * *

UNITED STATES PATENT AND TRADEMARK OFFICE
CERTIFICATE OF CORRECTION

PATENT NO. : 4,832,116

DATED : 23 May 1989

INVENTOR(S) : David Joseph Easton

It is certified that error appears in the above-identified patent and that said Letters Patent is hereby corrected as shown below:

In column 5, line 54, after "between", insert -- said first --.

In column 6, line 7, delete "11" and insert therefor -- 10 --.

In column 6, line 10, delete "acces" and insert therefor -- access --.

Signed and Sealed this

Twelfth Day of March, 1991

Attest:

HARRY F. MANBECK, JR.

*Attesting Officer*     *Commissioner of Patents and Trademarks*